2,714,618

MANUFACTURE OF CHLOROFLUOROCARBONS

Cyril Woolf, Morristown, N. J., assignor to Allied Chemical & Dye Corporation, New York, N. Y., a corporation of New York No Drawing. Application June 21, 1954,
Serial No. 438,361

9 Claims. (Cl. 260—653)

This invention relates to manufacture of 1,1,2,2-tetrachloro-1,2-difluoroethane, i. e. symmetrical tetrachlorodifluoroethane, $CCl_2FCCl_2F$, useful principally as a chemical intermediate, and particularly as an intermediate for manufacture of $CClF=CClF$ monomer.

Heretofore, catalytic reactions of anhydrous HF with $C_2Cl_4$ and elemental chlorine, or hexachloroethane, or $C_2Cl_5F$ in the gas phase have resulted in the formation of mixtures of $CCl_2FCCl_2F$ and $CCl_3CClF_2$, with the asymmetric $CCl_3CClF_2$ predominating. Prior art fluorinations of e. g. hexachloroethan by Swarts-type procedures have the disadvantage of forming a $CCl_2FCCl_2F$ containing product which can be purified only with difficulties which are in addition to the usual difficulties encountered in Swarts-type procedures because of the presence of antimony haldies. $CCl_2FCCl_2F$ has a boiling point of about 92.8° C. and a melting point of about 24.7° C., while $CCl_3CClF_2$ has a boiling point of about 91° C. and a melting point of about 40.6° C. In view of the close boiling points and the not too widely spread melting points of these two materials, from a practical viewpoint, the prior art difficulties attendant upon production of substantially pure $CCl_2FCCl_2F$ are self-evident.

A major object of the present invention lies in the provision of gas phase catalytic processes for making $CCl_2FCClF$ substantially free of $CCl_3CClF_2$. Another object is provision of processes for making $CCl_3CClF_2$-free $CCl_2FCCl_2F$ from principally $CCl_2=CCl_2$, a relatively low cost and readily available starting material, by easily controllable gas phase catalytic operations which function in such a way as to effect production of $CCl_2FCCl_2F$ without the formation of any appreciable amount of unwanted $CCl_3CClF_2$, and without the disadvantages which are inherently present in prior art methods.

The invention comprises the discovery of the properties of a zirconium tetrafluoride-activated carbon mass with respect to catalytic promotion of the reactions such as those subsequently disclosed. It has been found that the herein described zirconium tetrafluoride-activated carbon material catalyzes the subject reactions in such a way as to substantially exclude formation of $CCl_3CClF_2$ and to produce $CCl_2FCCl_2F$ substantially free of the isomer.

These catalytic materials may be made easily for example by impregnating activated carbon, of say 4–14 mesh size granulation, with an aqueous solution of a zirconium salt, such as zirconyl chloride $ZrOCl_2$, and drying at 125–200° C. in an inert gas stream such as nitrogen. Then the material is gassed with HF to convert the zirconium to $ZrF_4$, temperatures being maintained above 125° C. and preferably at about 150–200° C. Water and HCl formed during the reaction pass off in the vapor state. The presence in the reactor of water or other solvent in liquid form is undesirable in order to avoid dissolving out zirconium salt from the impregnated carbon. Gassing with HF is continued until tail gases of the HF gassing operation indicate that evolution of HCl and water has ceased.

In general, raw material serving as the source of zirconium may be any zirconium salt which is soluble in vaporizable solvent and which reacts with HF to form $ZrF_4$ and a by-product vaporizing at the temperature of HF gassing. Thus, materials such as $ZrOCl_2$, $ZrO(NO_3)_2$, and $ZrOCO_3$, $ZrO(OH)_2$ and also anhydrous $ZrCl_4$ may be used. While aqueous hydrochloric acid and water are the more desirable solvents, other suitable solvents may be employed. For example, a catalyst containing 20 weight parts of $ZrF_4$ per 100 parts of Columbia 6G carbon may be made by dissolving 28 grams of substantially anhydrous $ZrCl_4$ in 200 cc. of 10% hydrochloric acid, adding the liquid to 100 grams of the carbon, evaporating to dryness, transferring the impregnated carbon into a tubular nickel reactor heated by electric furnace, and passing preferably anhydrous HF into the impregnated carbon maintained at about 150–200° C. until evolution of water and HCl ceases. As another illustration, 100 grams of activated carbon may be dried in nitrogen at about 300° C., and refluxed with 70 cc. of acetic anhydride and 180 cc. glacial acetic acid. Then anhydrous $ZrCl_4$ (70 grams) may be added, and acetyl chloride distilled off. Residual acetic acid may be removed by distillation at 20 mm. Hg pressure. The product containing zirconium tetra-acetate may then be gassed with HF at about 200° C. until evolution of acetic acid ceases.

In making the catalyst, any of the commercially available activated carbons may be employed, e. g. Columbia 6G carbon, Columbia SW carbon, or Darco carbon. If desirable, the activated carbon may be treated preliminarily to remove any silica by leaching with aqueous HF, water washing, and drying. The relative quantities of activated carbon and e. g. zirconyl chloride initially employed may be such as to form an ultimate zirconium tetrafluoride-activated carbon mass which contains desirably a major quantity by weight of activated carbon and a minor quantity by weight of $ZrF_4$. On the other hand, amounts of zirconium salt and activated carbon may be such as to form a final zirconium tetrafluoride-activated carbon catalyst containing as little as about 5% by weight of $ZrF_4$. The catalyst preferably employed in practice of the invention may be considered as a zirconium tetrafluoride on activated carbon mass containing about 5–40% by weight of $ZrF_4$.

While no attempt is made to summarize and explain the mechanisms of intermediate reactions taking place in practice of the invention, when using $CCl_2=CCl_2$, elemental chlorine and anhydrous HF as raw materials, the net result under the operating conditions specified, appears to be

$$CCl_2=CCl_2+2HF+Cl_2 \rightarrow CCl_2FCCl_2F+2HCl$$

Reaction zone temperatures are maintained at or above the level at which fluorination of the $CCl_2=CCl_2$ organic starting material begins to take place in the presence of gaseous HF and free chlorine. Reaction takes hold at temperature as low as about 300° C., but commercially significant reaction appears to require temperature of about 375° C. and above. No particular advantages have been noted when temperatures are above 600° C. On the other hand, overall best results appear obtainable at temperatures below about 500° C. Hence, in general practice of the invention, preferred temperatures are in the approximate range of 375–500° C.

Mol ratios of $CCl_2=CCl_2$ to HF and to elemental chlorine are theoretically 1:2 and 1:1 respectively. In general, the quantities of HF and $Cl_2$ utilized are sufficient to provide for formation of chlorofluorocarbon reaction product containing a worthwhile quantity of $CCl_2FCCl_2F$. Preferably, amounts of HF and $Cl_2$ should not greatly exceed theoretical requirements, and, depending upon particular operating conditions, quantities of HF may vary from one to 2.6 mols per mol of $C_2Cl_4$, minimization of the amount of HF employed being preferred to reduce the quantity of tri and tetrafluorinated products formed. To facilitate good utilization of chlorine, amounts of the latter may vary from 0.75 to 1.25 mols per mol of $C_2Cl_4$.

Time of contact of $C_2Cl_4$ starting material with the described catalyst may be varied substantially without noticeable sacrifice of efficiency of operation. However, if contact time is excessive, i. e. low space velocities, the capacity of the reactor is low thereby causing economic disadvantages in the operation. On the other hand, if contact time is too short, the reaction of starting material to form desired product may be incomplete thereby entailing possible high cost of recovering and recycling unreacted material to subsequent operation. In all embodiments of the invention, contact time should be sufficient to effect fluorinating reaction of a commercially notable amount of the particular starting material. Contact time may lie in the range of about 2 to 25 seconds, preferably about 3 to 12 seconds. In a particular operation, optimum contact time, within the values indicated is dependent upon variables such as scale of operation, quantity of catalyst in the reactor, and specific apparatus employed and may be best determined by a test run. Atmospheric pressure operation is preferred, but the reaction may, if desired, be carried out at superatmospheric or subatmospheric pressure, the choice of pressure being largely one of convenience. If desired, $C_2Cl_6$ or $C_2Cl_5F$ may be used as starting material in place of $C_2Cl_4$ and chlorine. In the case of $C_2Cl_6$, temperatures, quantity of HF employed and contact times may be substantially as indicated when $C_2Cl_4$ is employed as organic starting material. If $C_2Cl_5F$ is utilized, temperatures and contact times may be about as indicated, and quantity of HF may vary from about 0.75 to 1.25 mols per mol of $C_2Cl_5F$.

Any suitable chamber or reactor tube constructed of inert material may be employed for carrying out the reaction provided the reaction zone afforded is of sufficient length and cross-sectional area to accommodate an adequate amount of catalyst and afford sufficient space for passage of the gas mixture at an economical rate of flow. Material such as nickel, graphite, Inconel or other substances resistant to HF are suitable for use as reactor tube. Externally disposed conventional means may be employed to furnish heating or cooling needed to maintain the desired catalyst bed temperatures. Since the overall reaction is exothermic to some extent, in large scale work the reaction is carried out preferably in tubular reactors which may be externally cooled.

Reaction products may be recovered by conventional procedure. The temperature of the gas stream exiting the reactor may be lowered in an initial cooler to e. g. 20 to 60° C., the gas stream then scrubbed with water to condense high boiling chlorofluorocarbons including the principal organic product and to remove HF and HCl from the gas stream, passed thru aqueous caustic solution to remove chlorine and residual small amounts of HCl and HF, then passed over calcium chloride or other drying agent. If recovery of low boilers is desired, the gas stream may be run thru a cold trap maintained at temperatures substantially below the boiling point of the lowest boiling material present, e. g. by indirect cooling of the gas in a bath of acetone and carbon dioxide ice. High boiling chlorofluorocarbons condensed in the water scrubber solution are separated therefrom, and the organic condensates together with those from the initial gas cooler may be combined with the condensate of the cold trap. The resulting composite liquor comprising reaction products and unreacted starting material, may be fractionally distilled to separate components to the extent desired.

The following are examples of practice of the invention, parts and percentages being by weight unless otherwise indicated.

*Example 1.*—150 cc. of catalyst, consisting of 81% Columbia carbon 6G and 19% $ZrF_4$, about 4 x 14 mesh, were charged into a one inch I. D. tubular nickel reactor maintained at a constant temperature by external electric heat automatically controlled by a potentiometric device actuated by a thermocouple. The reactor was heated for a length of about 36 inches, the catalyst being centrally disposed to allow about 12 inches for preheating of reactants. As preferred, to purify the incoming tetrachloroethylene, the latter was passed separately thru 150 cc. of Columbia 6G carbon, 8 x 14 mesh maintained at about 318° C. before entering the reactor. Thereafter the pretreated tetrachloroethylene was mixed with HF and chlorine and the mixture passed into the reactor. During reaction, temperature was in the range of about 450° C. to 473° C., the latter being the maximum internal temperature. Flow rates of reactants were as follows: HF, 1.25 mols/hr.; $C_2Cl_4$, 0.60 mol/hr.; and chlorine, 0.623 mol/hr. Conversions (per cent by weight reacted) of the reactants were about HF, 60%; $C_2Cl_4$, 72%, and chlorine, 69%. Contact time was about 4 seconds. The gas mixture exiting the reactor was handled by conventional methods, and the chlorofluorocarbon products recovered and quantities thereof were as follows: $CCl_2FCCl_2F$, B. P. 92.8° C., 0.253 mol/hr.; $C_2FCl_5$, B. P. 137.9° C., 0.144 mol/hr., and $CCl_2FCClF_2$, B. P. 47.7° C., 0.34 mol/hr. The $C_2Cl_5F$ may be recycled.

*Example 2.*—In this example, the same apparatus and catalyst as described in Example 1 were employed. Average internal temperature throughout the run was about 402° C. Flow rates of incoming reactants were HF, 1.18 mols/hr.; $Cl_2$, 0.645 mol/hr.; $C_2Cl_4$, 0.57 mol/hr. Conversions were as follows: HF, 43%; $Cl_2$, 68%; $C_2Cl_4$, 81.4%. Contact time was about 4 seconds. As in Example 1, the exit of reactor was handled by conventional methods, and the products and quantities recovered were as follows: $CCl_2FCCl_2F$, 0.118 mol/hr.; $C_2FCl_5$, 0.327 mol/hr.; and $CCl_2FCClF_2$, 0.003 mol/hr.

*Example 3.*—A 1.5 inch I. D. tubular nickel reactor was filled with 1000 cc. of catalyst consisting of 8 x 14 mesh Columbia 6G carbon containing about 7.4% of $ZrF_4$. During reaction, internal temperature was maintained at about 475° C. Flow rates of reactants were $C_2Cl_4$, 1.13 mols/hr.; chlorine, 1.13 mols/hr.; and HF, 2.80 mols/hr. Conversions of HF, $C_2Cl_4$ and chlorine were respectively 70.6%, 68.7% and 68.7%. Contact time was about 12 seconds. The reactor exit gas was handled conventionally, and products and quantities thereof recovered were as follows: $CCl_2FCCl_2F$, 0.35 mol/hr.; $C_2FCl_5$, 0.24 mol/hr.; $CClF_2CCl_2F$, 0.09 mol/hr. Minor quantities of $CClF_2CClF_2$ and $CCl_2F_2$ were recovered.

Examination, by melting point and infra red techniques, of the $CCl_2FCCl_2F$ products of each of the following examples failed to detect the presence of $CCl_3CClF_2$. Hence, such products were substantially free of $CCl_3CClF_2$.

I claim:

1. The process for fluorinating $CCl_2=CCl_2$ to form $CCl_2FCCl_2F$ which comprises introducing a gas phase mixture comprising $CCl_2=CCl_2$, substantially anhydrous HF and free chlorine into a reaction zone, the amount of HF and free chlorine being sufficient to ultimately form a substantial quantity of $CCl_2FCCl_2F$, and heating said mixture in said zone at temperature in the approximate range of 300–600° C., while in the presence of zirconium tetrafluoride-activated carbon catalyst, for a time sufficient to cause fluorinating reaction of a substantial quantity of $CCl_2=CCl_2$ and effect formation of a gaseous chlorofluorocarbon reaction product comprising a substantial quantity of $CCl_2FCCl_2F$.

2. The process of claim 1 in which there is recovered $CCl_2FCCl_2F$ substantially free of $CCl_3CClF_2$.

3. The process of claim 1 in which temperature is in the approximate range of 375–500° C.

4. The process for fluorinating $CCl_2=CCl_2$ to form $CCl_2FCCl_2F$ which comprises introducing a gas phase mixture comprising $CCl_2=CCl_2$, substantially anhydrous HF and free chlorine into a reaction zone, the amount of HF and free chlorine being sufficient to ultimately form a substantial quantity of $CCl_2FCCl_2F$, and heating said mixture in said zone at temperature in the approximate range of 300–600° C., while in the presence of zirconium tetrafluoride-activated carbon catalyst.

5. The process for making $CCl_2FCCl_2F$ which comprises introducing into a reaction zone a gas phase mixture of the group consisting of (1) $CCl_2=CCl_2$, substantially anhydrous HF and free chlorine, (2) $C_2Cl_6$ and substantially anhydrous HF, and (3) $C_2Cl_5F$ and substantially anhydrous HF; the amount of HF and chlorine available being sufficient to ultimately form a substantial quantity of $CCl_2FCCl_2F$, and heating said mixture in said zone at temperature in the approximate range of 300–600° C., while in the presence of zirconium tetrafluoride-activated carbon catalyst, for a time sufficient to cause fluorinating reaction and effect formation of a gaseous chlorofluorocarbon reaction product comprising a substantial quantity of $CCl_2FCCl_2F$.

6. The process of claim 5 in which temperature is in the approximate range of 375–500° C.

7. The process of claim 5 in which there is recovered $CCl_2FCCl_2F$ substantially free of $CCl_3CClF_2$.

8. The process for fluorinating $CCl_2=CCl_2$ to form $CCl_2FCCl_2F$ which comprises introducing a gas phase mixture comprising $CCl_2=CCl_2$, substantially anhydrous HF and free chlorine into a reaction zone, the amount of HF and free chlorine being sufficient to ultimately form a substantial quantity of $CCl_2FCCl_2F$, heating said mixture in said zone at temperature in the approximate range of 375–500° C., while in the presence of a zirconium tetrafluoride on activated carbon catalyst, for a time sufficient to cause fluorinating reaction of substantial quantity of $CCl_2=CCl_2$ and effect formation of a gaseous chlorofluorocarbon reaction product comprising substantial quantity of $CCl_2FCCl_2F$, and recovering $CCl_2FCCl_2F$ substantially free of $CCl_3CClF_2$.

9. The process of claim 8 in which there are introduced into the reaction zone $Cl_2$ and $C_2Cl_4$ in mol ratio in the approximate range of 0.75:1–1.25:1, and HF and $C_2Cl_4$ in mol ratio in the approximate range of 1:1–2.6:1.

References Cited in the file of this patent

UNITED STATES PATENTS

| | | |
|---|---|---|
| 2,439,299 | Hovey et al. | Apr. 6, 1948 |
| 2,466,189 | Waalkes | Apr. 5, 1949 |